Dec. 5, 1967  P. G. BINNS  3,355,888
ROCKET PROPULSION MOTORS
Filed Feb. 19, 1960  9 Sheets-Sheet 1

Philip Gordon Binns
Inventor

By
Fred L. Witherspoon, Jr. &
Fred E. Shoemaker Attorneys

Fig. 5.

Inventor:
Philip Gordon Binns
By Fred L. Witherspoon, Jr. &
Fred E. Shoemaker Attorneys

United States Patent Office 3,355,888
Patented Dec. 5, 1967

3,355,888
ROCKET PROPULSION MOTORS
Philip Gordon Binns, Littleover, Derby, England, assignor to Rolls-Royce Limited, Derby, England, a company of Great Britain
Filed Feb. 19, 1960, Ser. No. 9,993
Claims priority, application Great Britain, Mar. 11, 1959, 8,500/59
15 Claims. (Cl. 60—223)

This invention concerns rocket propulsion motors.

According to the present invention there is provided a rocket propulsion motor having one or more valves which are arranged to "fail safe" both when the rocket is on the ground and when it is in flight.

By "fail safe" is meant that, at least for the most probable failures which would affect operation of these valves, the valves should remain, on such failures occurring, in positions such that there will be the minimum danger to life and property.

Thus, assuming that the said valves control flow of liquid oxygen and fuel to the thrust chamber or chambers of the rocket, the valves are such that, if the rocket is on the ground when such failure occurs, the valves will close in order to shut down the motor. On the other hand, if the rocket is in the air when such failure occurs, the valves will remain open so that the rocket continues in flight away from the launching area.

In its preferred form, each such valve comprises a valve closure member which is movable between a closed and an open position and two devices, which are operable separately of each other, for effecting movement of the valve closure member, the first of said devices comprising retaining means for normally retaining the valve closure member in the open position and overriding means for overriding the retaining means and moving the valve closure member to the closed position, and the second device comprising retaining means for normally retaining the valve closure member in the closed position and overriding means for overriding the retaining means and moving the valve closure member to the open position.

The retaining means of one of the devices may comprise latch means which, on movement of the valve closure member into a given position, retain the valve member in this position, the overriding means comprising means for unlatching the latch means. The retaining means of the other device, however, may be pressure fluid operated.

Preferably the overriding means of both the first and the second device are pressure fluid operated.

Thus each said valve preferably comprises a piston working in a cylinder, the valve closure member being connected to the piston for movement thereby, means for moving the piston in the cylinder to positions in which the valve closure member will be respectively opened and closed, latch means movable into and out of engagement with said piston, means operative upon the piston moving into one of said positions for moving the latch means so that it engages the piston and prevents retraction thereof into the other position, and means for withdrawing the latch means so as to permit said retraction. Thus the opposite ends of the cylinder may be connected to a first pressure fluid source, a control valve (e.g. a solenoid valve) being provided for selectively connecting one or other end of the cylinder to the first pressure fluid source. The arrangement is preferably such that when the control valve is set so that pressure fluid is supplied to one of the ends of the cylinder, pressure fluid is also supplied from the first pressure fluid source to the latch means to effect unlatching thereof.

Preferably there is a second fluid pressure source which is connected to the said one end of the cylinder and to the latch means so as to be adapted to effect unlatching of the latter.

The said solenoid valve may form part of ground equipment which is left behind on take-off of the rocket energisation and de-energisation of the solenoid of this valve respectively effecting opening and closing of the valve closure member. The valve apparatus will therefore "fail safe" while on the ground in the sense that, if there should be a failure in the electrical system supplying the solenoid, the solenoid will be de-energised and closing of the valve closure member (and hence close-down of the motor) will occur. Detector equipment may also be provided on the ground which, on departure of an engine variable from a predetermined permissible range (e.g. on excessive turbine speed) effects de-energisation of the solenoid and consequent close-down of the motor.

At the same time, the latch means may be arranged to latch the said piston in the position in which the valve closure member is open, whereby the valve apparatus will "fail safe" while in the air since the valve closure member will be retained in the open position by its latch means.

The said second fluid pressure source may be constituted by a pyrotechnic cartridge which may be fired by an electrical signal sent from ground control, firing of the cartridge producing a volume of gases which act on the piston and latch means so as to effect closing of the valve closure member.

Preferably means are provided for limiting the acceleration of the rocket. Thus the acceleration limiting means may maintain the thrust produced by the rocket propulsion motor substantially constant during an initial portion of the flight of the rocket and thereafter reduce the thrust in a predetermined manner.

Preferably the rocket propulsion motor comprises a thrust chamber with a liquid fuel and an oxidant from sources thereof, and means for adjusting the relative amounts of liquid fuel and oxidant supplied to the thrust chamber so as to ensure that the said sources of liquid fuel and oxidant are exhausted substantially simultaneously.

Thus means may be provided for throttling the flow of liquid fuel to the thrust chamber so that said flow bears at all times a predetermined relationship to the flow of oxidant. Preferably the throttling means is constituted by the said "fail safe" valve, the valve closure member of the valve being movable, when in the open position, by means responsive to the extent to which the said sources of liquid fuel and oxidant have become exhausted.

The invention is illustrated, merely by way of example, in the accompanying drawings in which.

The terms "left," "right," "above," "below" and the like, as used in this specification are to be understood to refer to directions as seen in the drawings.

Referring first to FIGURES 1–4, a rocket propulsion motor comprises a thrust chamber 10. A liquid oxygen pump 11, the supply of liquid oxygen to which is derived from a liquid oxygen tank (not shown) in, for example, the forward half of the rocket, serves to pump liquid oxygen through a pipe 12 to the thrust chamber 10. Similarly, a fuel pump 13, the supply of fuel to which is derived from a fuel tank (not shown) in, say, the after half of the rocket, serves to pump liquid fuel through a pipe 14 to spray nozzles 15 of the thrust chamber 10.

In order to increase the thrust as much as possible, the thrust chamber 10 has a throat 10′, whose diameter is somewhat less than that of the upstream end of the thrust chamber, and a downstream diverging portion 10″ in which the gases can expand supersonically to atmospheric pressure.

Across the downstream end of the thrust chamber 10 there is stretched a detector wire 9 whose purpose is described below.

The spray nozzles 15 for the liquid oxygen and fuel in the thrust chamber 10 are provided in an injector plate 16, the arrangement being such that, so far as possible, a constant mixture ratio is provided. In order to promote atomization and mixing of the liquid oxygen and fuel, a large number of nozzles 15 are employed.

A pyrotechnic igniter 16′ is provided for the ignition of the combustible mixture in the thrust chamber 10.

A gas generator 17 comprises a substantially spherical container within which is mounted an injector plate 18 provided with spray nozzles 19. Except when the rocket motor is being started (as will hereinafter appear), liquid oxygen from the pipe 12 is supplied to some of the spray nozzles 19 via pipes 20, 21, while fuel is supplied from the pipe 14 to the remaining spray nozzles 19 via pipes 22, 23. The arrangement is such as to give, so far as possible, a constant mixture ratio of fuel and oxygen in the gas generator.

The pipes 20, 22 have, respectively, check valves 24, 25 therein to ensure that flow through these pipes may occur towards the gas generator 17 only.

An electrical or pyrotechnic igniter 26 is provided to effect ignition of the fuel and oxygen flowing into the gas generator via the nozzles 19. Part of the fuel supply from the pipe 23 is introduced into the gas generator via a pipe 27 at whose outlet end is a spray nozzle 28.

A tubular baffle 31 is mounted about the spray nozzle 28. The baffle 31 promotes turbulence in the gas produced within the gas generator 17, whereby to avoid local hot and cold spots, and also causes the flame within the gas generator 17 to adopt a tortuous path, whereby the gas generator may be made smaller than would otherwise be possible. The fuel spray from the nozzle 28 impinges on the lip at the upper end of the tubular baffle 31 so as to cool said lip.

A duct 29 is provided through which gases generated in the gas generator 17 may flow from the gas generator and into a two-stage gas turbine 30 so as to drive the latter.

The gases exhausted from the turbine 30 are directed into an exhaust duct 32 and so to atmosphere. A pipe 33, which communicates with the pipe 20, has a portion 33′ extending into the duct 32 so as to be in heat exchange therewith. Liquid oxygen flowing through the pipe 33 is converted, by such heat exchange, into gaseous oxygen which is employed to pressurise the liquid oxygen tank.

A further pipe 33″ is also arranged in heat exchange with the duct 32. The pipe 33″ is supplied with liquid nitrogen from a bottle 7 thereof and the liquid nitrogen is converted by such heat exchange into gaseous nitrogen which is used to pressurise the fuel tank.

The turbine 30 is mounted on a shaft 34 which, by way of a gear train 35 housed in a gearbox 35′, drives a pump shaft 36. Impellers 37, 38 of the liquid oxygen pump 11 and fuel pump 13 respectively are mounted on the shaft 36 so as to be driven thereby. Auxiliary equipment 39 is also driven from the gear train 35.

Lubrication and cooling of the gears and bearings within the gear box 35′ is effected by a supply of lubricant provided within a cylindrical container 40. Slidably mounted within the container 40 is a dished plate 41 which serves to separate the container 40 into two compartments 42, 43 which are sealed from each other. The plate 41 has a centrally located collar 44 which is slidable on a tube 45 extending centrally of the container 40. The interior of the tube 45 communicates via a pipe 46 with the fuel pipe 22. Fuel flowing from the pipe 22 and into the tube 45 may escape through holes 47 in the tube 45 so as to pass into the compartment 43. The lubricant is housed within the compartment 42 and may be supplied therefrom to the gear box 35′ via a pipe 48.

Part of the fuel flowing through the pipe 46 passes via a pipe 49 into a mixture device 50 in which the fuel and lubricant are mixed together. The fuel pressure applied to the plate 41 by the fuel in the compartment 43 is effective, in operation, to force the fuel/lubricant mixture through the pipe 48 and into the gearbox 35′.

The speed of gas generation in the gas generator 17, and hence the speed of the turbine 30, can be increased or decreased by corresponding increase or decrease of the oxygen supply to the gas generator. This will, of course, cause corresponding alteration of the speed of both the liquid oxygen pump 11 and the fuel pump 13.

In order to vary the speed of gas generation a liquid oxygen supply regulator 51 is provided comprising a needle valve 52 which extends into the pipe 21 in such a way that flow through the pipe 21 will be adjusted upon axial movements of the needle valve 52. The needle valve 52 is carried by a diaphragm 53 which divides the regulator 51 into compartments 54, 55 which are respectively disposed above and below the diaphragm 53.

The compartment 54 communicates, by way of a T-shaped passage 56 axially through the needle valve 52, with the pipe 21, whereby the pressure in the compartment 54 will be dependent upon that in the pipe 21 and hence dependent upon the delivery pressure of the liquid oxygen pump 11.

The pressure in the compartment 55 is arranged by means (not shown) to be a constant reference pressure.

It will be appreciated that if the pump 11 overspeeds with a consequent pressure rise in the pipe 21, the pressure in the compartment 54 will rise so as to cause the needle valve 52 to restrict flow through the pipe 21. This will cut down the quantities of gases generated in the gas generator 17 and hence will reduce the speed of the pump 11. Similarly, if the speed of the pump 11 were too slow, the pressure in the compartment 54 would fall, the needle valve 52 would move so as to permit greater flow through the pipe 21, and gas generation in the generator 17 would rise, whereby to increase the speed of the pump 11.

The regulator 51 also includes a compartment 57 having a pressure relief valve 58. The compartment 57 will be pressurised by the gas leakage occurring about the circumference of the needle valve 52. This arrangement, therefore, provides a "blow-off" which protects the regulator 51 from the entry of moisture which might otherwise freeze within the regulator 51 so as to cause it to seize up.

Flow of liquid oxygen and fuel through the pipes 21, 23 respectively to the gas generator 17 is controlled by valves 60, 61 respectively. The valves 60, 61 are mounted on a common spindle 62, the spindle 62 being connected for rotation thereby to a piston 63 working in a cylinder 64.

The piston 63 is normally urged by a spring 65 towards the position in which the valves 60, 61 are closed. The cylinder 64, however, on the side of the piston 63 remote from the spring 65, contains a body of hydraulic liquid which may be pressurised by movement of a piston 66. The piston 66 works in a cylinder 67 which, so long as the rocket is on the ground, may be rendered open via a pipe 68 to a supply of pressure nitrogen within a pneumatic manifold 69.

The pneumatic manifold 69 forms part of ground equipment 70 which is disconnected from the rocket on the latter leaving the ground. The ground equipment 70 comprises a pipe 71, which is adapted to be supplied with nitrogen from the manifold 69, the pipe 71 communicating with a gas generator valve 72, a liquid oxygen valve 73 and a fuel valve 74, all of which are solenoid valves, by way of branch pipes 75, 76, 77 respectively.

The gas generator valve 72 is adapted to control the supply of pressure nitrogen selectively either to the pipe 68 or to a pipe 78 according to whether the solenoid of the valve 72 is energised or de-energised.

Figure 1:
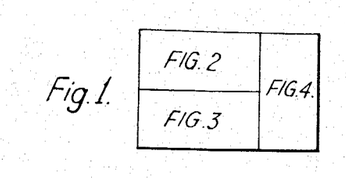
FIGURE 1 indicates the relative positions of the parts shown in FIGURES 2–4.
Figure 2:
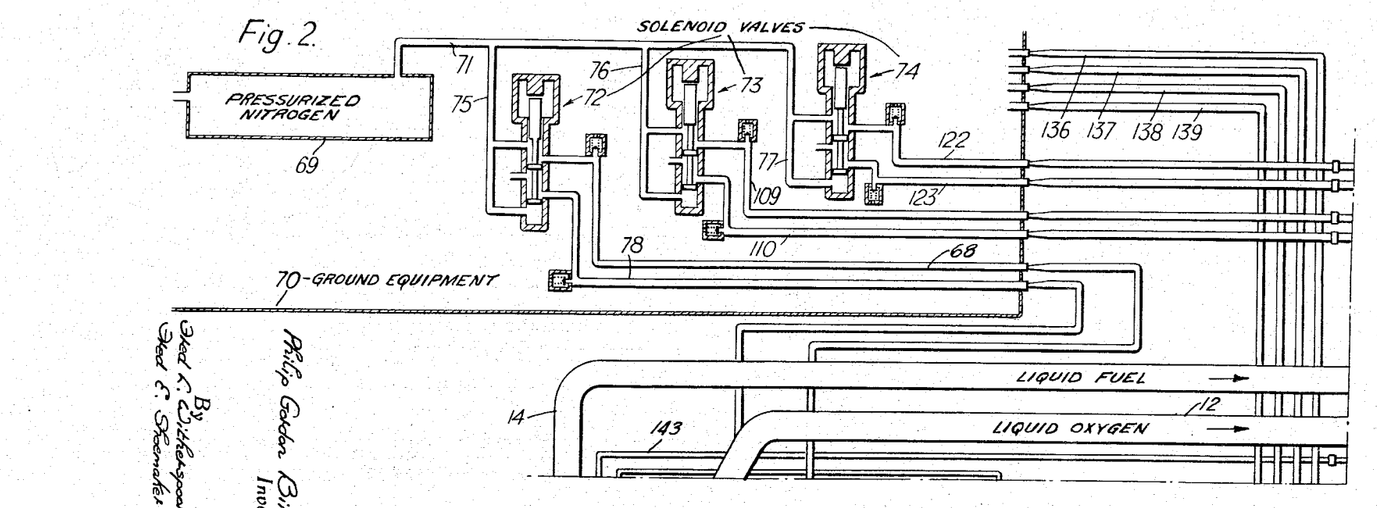
FIGURES 2–4 considered collectively illustrate schematically a first embodiment of a rocket propulsion motor according to the invention.
Figure 3:
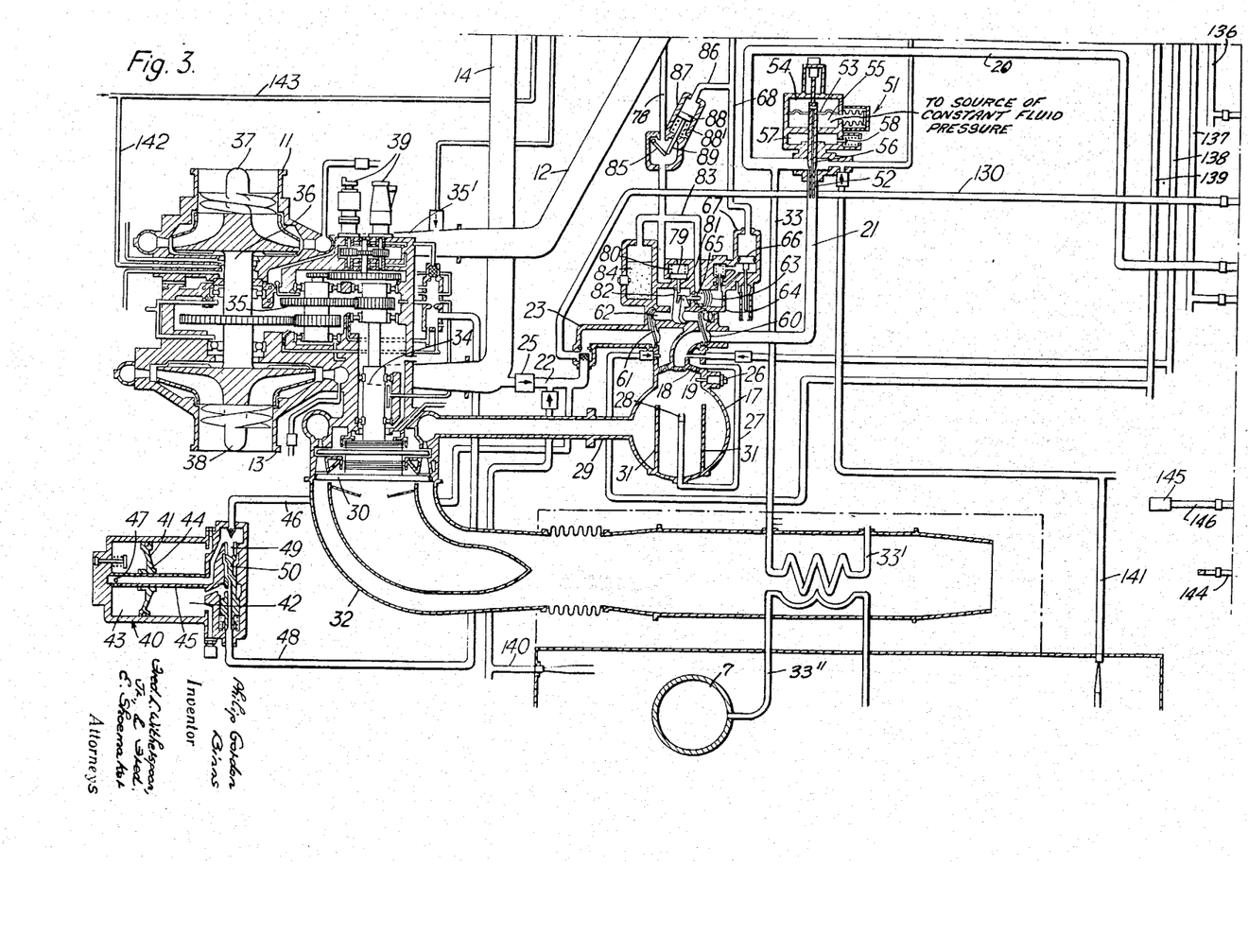
Figure 4:
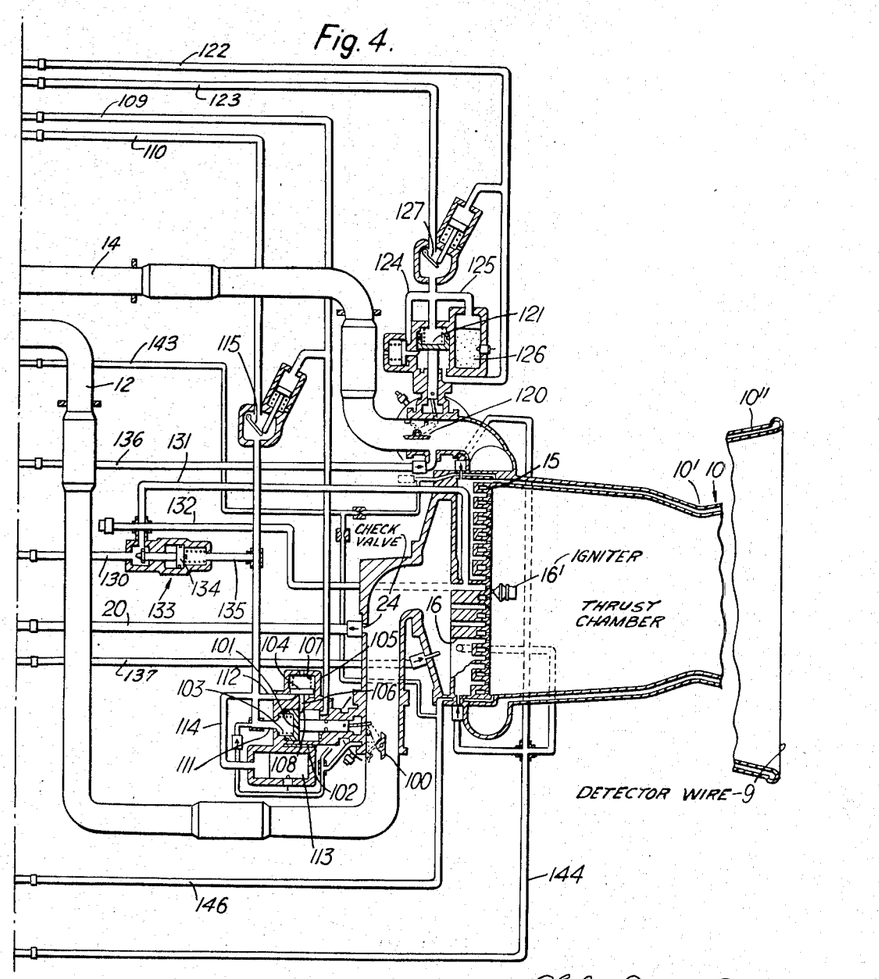

The valve 72 is shown in FIG. 2 in the energised position in which pressure nitrogen will be fed through the pipe 68 so as to urge the piston 63 towards the position in which the valves 60, 61 are open. When, however, the solenoid of the valve 72 is de-energised, the pipe 68 will be vented and the pipe 78 supplied with pressure nitrogen. This will effect lifting of a piston 79 against a spring 80 so as to withdraw its piston rod 81 from a finger 82 carried by the spindle 62. On the withdrawal of the piston rod 81, the spring 65 will move valves 60, 61 to the closed position, such movement being assisted by a supply of pressure nitrogen to the spring side of piston 63 via a pipe 83. Accordingly once the valves 60, 61 are open they are held latched in the open position by the piston rod 81. The arrangement is therefore a "fail safe" arrangement inasmuch as, if there is a failure of a kind affecting operation of the valves, the valves will remain in the open position in which fuel and oxygen will continue to be supplied to the gas generator 17.

Accordingly, if the rocket is in flight such flight will not be interrupted as a result of such failure. If, however, the rocket is on the ground and it is desired to stop generation of the gases in the gas generator 17, this may be simply done by de-energisation of the solenoid of the valve 72. As explained above, such de-energisation may be made to occur as soon as ground detector equipment detects a dangerous alteration in an engine variable, e.g. turbine speed.

The ground equipment 70 is, as stated above, left behind on take-off of the rocket and, in order to permit closing of the valves 60, 61 in flight a pyrotechnic cartridge 84 is provided. The cartridge 84 is adapted to be fired electrically by remote control and to produce, when fired, a volume of gases which are supplied to the pipes 78, 83 so as to effect lifting of the piston 79 and rightward movement of the piston 63.

In order to prevent escape of gases from the cartridge 84 through the end of the pipe 78, which will be open in flight, the pipe 78 is provided with a closure member 85 which will be closed by the pressure of the gases from the cartridge 84 but which will be opened by the pressure of nitrogen supplied through the pipe 78 from the manifold 69. Similarly nitrogen supplied from the manifold 69 and through the pipe 68 will pass through a branch pipe 86 to a cylinder 87 whereby to move a piston 88 in said cylinder against its spring 88' to a position in which its piston rod 89 opens the closure member 85.

The liquid oxygen supply pipe 12 is provided with a valve 100 movable by a piston 101 working in a cylinder 102. The piston 101 is urged by a spring 103 towards a position (not shown) in which the valve 100 is shut. The piston 101 is, however, adapted to be held in the open position shown in FIG. 4 by a latch comprising a piston 104 working in a cylinder 105, the piston 104 having a piston rod 106 which is engageable with the piston 101 so as to latch it in the open position. A spring 107 urges the piston 104 towards the latched position, while the outer end 108 of the piston rod 106 is chamfered so as to permit the piston 101 to move freely from the closed to the open position.

The liquid oxygen valve 73 admits the nitrogen from the manifold 69 selectively either to a pipe 109 or to a pipe 110 according to whether or not the solenoid of the valve 73 is energised. When the solenoid is energised, nitrogen is supplied via pipe 109 to the side of the piston 101 remote from the spring 103 so as to move the piston 101 to the open position in which it will be held latched. On de-energisation of the solenoid of the valve 73, however, nitrogen is supplied through pipe 110 and via pipes 111, 112 respectively to the side of the piston 101 on which bears the spring 103 and to the side of the piston 104 remote from the spring 107. This will cause the piston 104 to be moved against its spring 107 so as to unlatch the piston 101, the latter then moving to its closed position under the spring 103 and under the pressure of the nitrogen supplied through the pipes 110, 111.

Alternatively unlatching of the piston 101 and its movement to the closed position may be effected by electrically firing a pyrotechnic cartridge 113, the gases evolved on firing of the cartridge being supplied to the pipes 111, 112 via a pipe 114. A valve closure member 115, which is generally similar to, and which is adapted to be opened and closed in a similar way to, the closure member 85 is provided in the pipe 110 so as to prevent loss therethrough of the gases produced on the firing of the cartridge 113.

The liquid fuel supply pipe 14 is provided with a valve 120 which is movable by a piston 121. The manner in which the piston 121 is moved so as to move the valve 120 between the open and closed positions corresponds exactly to that of the piston 101 and will not therefore be described in detail. Suffice it to say that the fuel valve 74 controls the supply of nitrogen from the manifold 69 to either a pipe 122 or a pipe 123 in dependence upon whether or not the solenoid of the valve 74 is energised. The pipe 122 communicates with one side of the piston 121 while the pipe 123 communicates with pipes 124, 125 and so supplies the nitrogen required to effect unlatching of the piston 121. The pipes 124, 125 are supplied, on firing of a cartridge 126, with gases which effect unlatching of the piston 121. A valve closure member 127, corresponding to the members 85, 115, is provided in the pipe 123.

It will therefore be appreciated that the valves 100, 120 incorporate a "fail safe" arrangement effective when the rocket is in the air inasmuch as, if there is a failure of a kind affecting operation of these valves, the valves will remain in the open position in which liquid oxygen and fuel will continue to be supplied to the thrust chamber 10. Accordingly if the rocket is in flight such flight will continue. If, however, it is desired to stop flight of the rocket in the air and therefore to stop the fuel and oxygen supply to the thrust chamber, this may be effected by firing (by a remote control) the cartridges 113, 126.

On the ground, a "fail safe" arrangement is also provided since the fuel and oxygen supply to the thrust chambers will be stopped on de-energisation of the solenoids of the valves 73, 74 and such de-energisation will, of course, occur if the electrical supply to the solenoids fails, or if the solenoids are de-energised by ground detector equipment as discussed above.

An ignition system is provided for the ignition of the liquid/fuel mixture fed to the thrust chamber 10. This system comprises a pipe 130 which communicates with the fuel pipe 22 and with pipes 131, 132 leading to the fuel spray nozzles of the thrust chamber 10.

A fuel igniter shut-off valve 133 controls flow through the pipe 130. The valve 133 comprises a piston 134 which is spring urged towards the closed position. The pressure of the liquid fuel in the pipe 130 will normally force the piston 134 into the open position. However, the piston 134 may be moved when required to the closed position since it is open via a pipe 135 either to the pressure of the nitrogen from the manifold 69, when the solenoid of valve 73 is de-energised, or to the gases produced on the firing of the cartridge 113.

The rocket propulsion motor is provided with pipes 136-9 for the purging of the pipe 14, the dome of the thrust chamber 10, the pipe 21 and the pipe 23 respectively. Similarly pipes 142, 143, which may be supplied with nitrogen from the above-mentioned missile bottle, are provided for the purging of a seal on the pump shaft 36 and for purging the fuel supply lines in the thrust chamber 10. A pipe 144 is provided for the purging of the liquid oxygen supply lines in the thrust chamber 10.

The purpose of such purging is to prevent the fuel and liquid oxygen contacting each other anywhere, except where combustion is to occur. Thus a seal separating the fuel and liquid oxygen may be purged by supplying it with gas under pressure so that any fuel or liquid oxygen leaking through the seal will be blown away.

Pipes 140, 141 are also provided so as respectively to enable a ground supply of fuel and a ground supply of liquid oxygen to be passed to the rocket propulsion motor.

A transducer 145 is provided for measuring the pressure in the thrust chamber 10, the said pressure being transmitted to the transducer 145 through a pipe 146.

On starting the rocket propulsion motor, the valves 100, 120 which control supply of liquid oxygen and fuel to the thrust chamber, are closed, as are the valves 60, 61. The rocket will of course at this stage be on the ground and will be connected to the ground equipment 70.

Starting of the rocket propulsion motor is effected by supplying liquid oxygen and fuel to the pipes 141, 140 respectively. The pyrotechnic igniter 16' is now operated so as to effect combustion of the liquid oxygen and fuel which reaches the thrust chamber 10 from the pipes 140, 141. The firing of the pyrotechnic igniter 16' is detected by a detector device (not shown) which effects energisation of the solenoid of the valve 73 and hence opening of the valve 100. The thrust chamber 10 will therefore have a low pressure supply of oxygen (whose pressure will depend on the head of liquid oxygen in the tank thereof) and a fuel supply derived through the pipes 140, 130. The fuel will be able to flow through the pipe 130 by reason of the fact that the energisation of the solenoid of the valve 73 ensures that nitrogen is no longer supplied through the pipes 110, 135 so as to cause closure of the valve 133. The valve 133 will therefore be opened by the pressure of the fuel in the pipe 130. At this stage no fuel or liquid oxygen from the pipes 140, 141 will enter the gas generator 17 since the valves 60, 61 will be closed.

When combustion in the thrust chamber 10 has proceeded sufficiently, the detector wire 9 is burnt out and this effects (by means not shown) energisation of the solenoid of the valve 74 whereby the valve 120 is opened. Electrical timing means (not shown) then effect, after a predetermined delay, firing of the igniter 26 in the gas generator 17. Detector means (not shown) are employed to detect this firing and, when this has been detected, the solenoid of the valve 72 is energised (by means not shown). This effects opening of the valves 60, 61 and so permits the gas generator 17 to be supplied with fuel and liquid oxygen which are ignited by operation of the igniter 26. The gases produced by the gas generator 17 will drive the turbine 30 and hence the pumps 11, 13 which will bring the liquid oxygen and fuel supplies up to full pressure.

Referring now to the preferred embodiment of the present invention, in the rocket propulsion motor shown in FIGURE 5 the parts shown below the chain dotted line 149 remain on the ground when the rocket takes off. The said rocket propulsion motor comprises a thrust chamber 150 which is supplied with liquid oxygen and liquid fuel through pipes 151, 152 respectively. Pumps 153, 154 are provided for pumping the liquid oxygen and liquid fuel respectively, the pumps being mounted on a common shaft 155 which is driven by a two-stage turbine 156 through gearing 157. The gearing 157 is mounted in a gear box 158 which is supplied with a fuel/lubricant mixture from a container 159. The turbine 156 is driven by the gases produced in a gas generator 160 which is supplied with fuel from the pump 154 by way of a pipe 161, the said gases being exhausted to atmosphere through a duct 162. The parts of the FIGURE 5 construction so far referred to are substantially identical to the like parts in the FIGURE 1 construction and therefore will not be described in detail.

Figures 8, 11, 12:
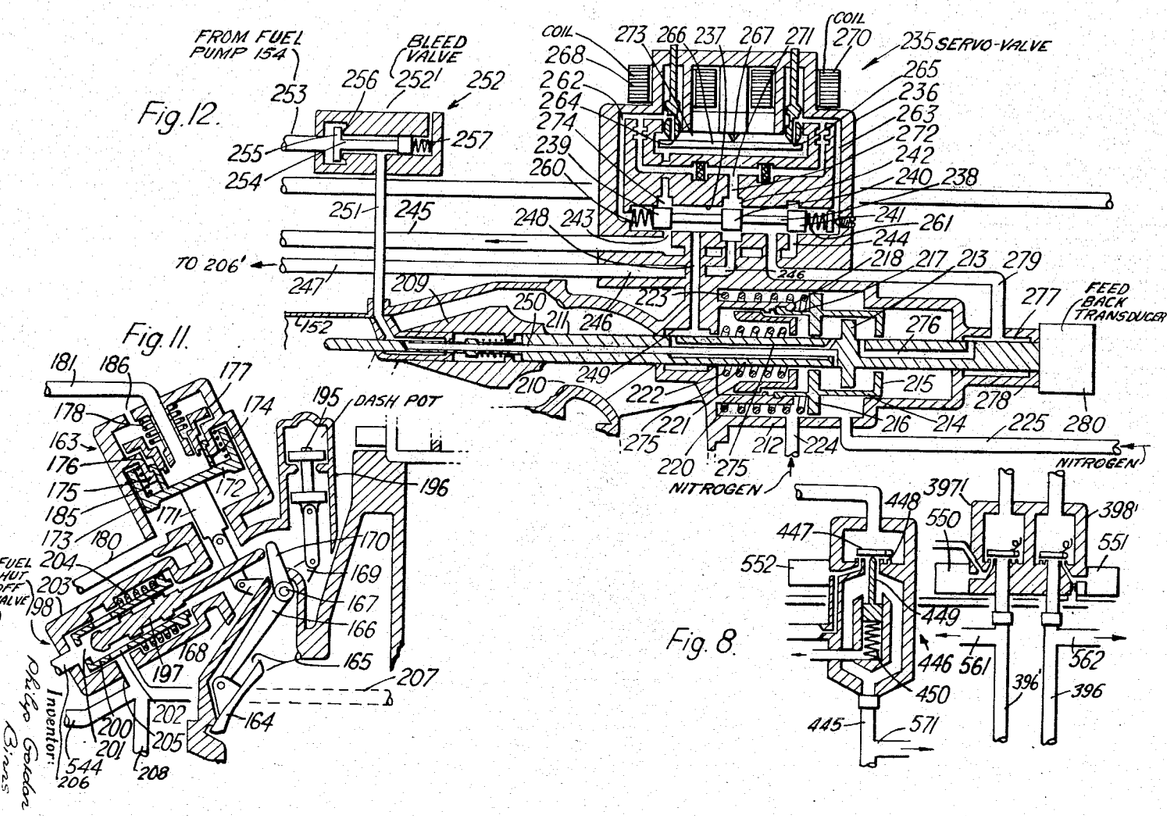

The flow of liquid oxygen through the pipe 151 is controlled by a valve 163 (see FIGURE 11). The valve 163 comprises a plate-like valve member 164 which is shown in FIGURE 11 in the open position but which may be moved into a closed position in which it is positioned against an annular valve seat 165. The valve member 164 is pivotally mounted on an arm 166 which is carried by a spindle 167. The latter also carries a bell-crank lever 168, 169 and an arm 170.

The lever 168 is connected to the piston rod 171 of a piston 172 which works in a cylinder 173. The piston 172 is provided with an inner skirt which is slit longitudinally so as to provide a series of resilient fingers 174 which are engageable behind a shoulder 175 provided on a substantially cylindrical member 176 mounted within the cylinder 173. A substantially cylindrical detent member 177 is mounted within the cylinder 173 and is urged by a spring 178 into a position in which it bears against the fingers 174 so as to prevent their withdrawal from the shoulder 175.

Figure 10:
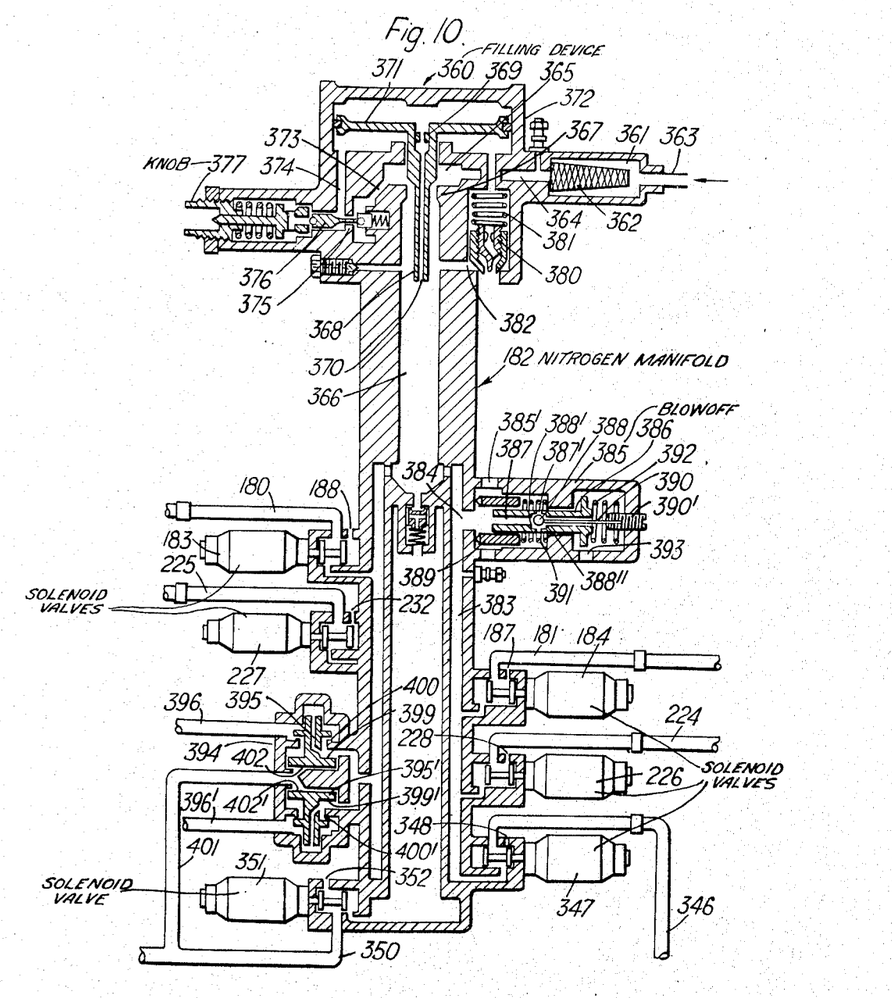

Pipes 180, 181 communicate at one end with the upper and lower parts respectively of the cylinder 173 and at the other end with a ground nitrogen manifold 182, FIGURE 10, communication between the pipes 180, 181 and the manifold 182 being controlled by solenoid valves 183, 184 respectively. When the valves 183, 184 are energised they are positioned as shown in FIGURE 10 and nitrogen is supplied from the manifold 182 and through the pipe 180 to the lower side of the piston 172 so as to urge the piston 172 towards the closed position and against a spring 185. At the same time the space above the piston 172 is vented to atmosphere through a vent 186 in the cylinder 173 and through a vent 187 controlled by the valve 184. When, however, the valves 183, 184 are deenergised, they are moved into a position (not shown) in which the pipe 180 communicates with a vent 188 so as to effect venting of the space below the piston 172 whilst nitrogen from the manifold 182 is supplied via the pipe 181 to the space above the piston 172.

It will, therefore, be appreciated that the valve 163 incorporates a "fail safe" arrangement effective when the rocket is in the air inasmuch as, if there is a failure of a kind affecting operation of the valve, the valve will remain locked in the open position in which liquid oxygen will continue to be supplied to the thrust chamber 150. This locking takes place by reason of the fingers 174 being locked behind the shoulder 175 by the detent member 177.

If, however, it is desired to stop the flight of the rocket in the air and therefore to stop the liquid oxygen supply to the trust chamber 150, this may be effected by firing (by a remote control) a cartridge 190 (FIGURE 5) the gases so produced being supplied to the pipe 181, and so to the upper part of the cylinder 173, by way of a pipe 191 controlled by non-return valves 192, 193. This will cause lifting of the detent member 177 away from the fingers 174, whilst the piston 172 will be forced downwardly both by the pressure of the said gases and by its spring 185.

On the ground, a "fail safe" arrangement is also provided since, if the electrical supply to the solenoids 183, 184 fails or if the solenoids are deenergized by ground detector equipment which senses imperfect operation of the rocket propulsion motor, then nitrogen will be supplied to the space above the piston 172 whereby to effect closure of the valve 164 and so to cut off the liquid oxygen supply to the thrust chamber 150.

Movement of the lever 168 by the piston 172 causes corresponding movement of the lever 169 and arm 170.

The level 169 is connected to the piston valve 195 of a dashpot 196 so as to promote smooth and (relatively speaking) gradual operation of the valve 163. The operation of the dashpot 196 may be adjusted (by means not shown) to ensure that the speed at which the valve 163 opens and closes does not exceed a predetermined value.

The arm 170 bears against a slide valve member 197 of a fuel shut-off valve 198. The slide valve member 197 is slidable in a sleeve 200 having a port 201 at one end and ports 202 in its cylindrical wall. The slide valve member 197 is itself slidably mounted in a cylindrical valve body 203 and is urged by a spring 204 into the position shown in FIGURE 11 in which the ports 202 communicate with a pipe 205. In the FIGURE 11 position, fuel reaching the fuel shut-off valve 198 via a pipe 206 which communicates, via a pipe 206', with the pipe 161, will force the slide valve member 197 against the arm 170. The fuel will then pass through the port 201 and ports 202 to the pipe 205 and so via pipes 207, 208 to the thrust chamber 150. When, however, the valve 163 is moved into the closed position, the arm 170 will force the slide valve member 197 towards the left so as first to close the port 201 and thereafter to move the sleeve 200 so as to bring the ports 202 out of alignment with the pipe 205. The fuel flow to the thrust chamber from the pipe 206 will therefore be stopped. The arrangement is such that the valve member 197 closes the port 201—and therefore cuts off the fuel flow through the pipe 206—before the valve member 164 is full seated.

The fuel flow to the thrust chamber 150 through the pipe 152 is controlled by a valve 209 (FIGURE 12) which is adapted to cooperate with a valve seat 210. The valve 209 is carried by a valve rod 211 which extends into a valve body 212 and which is provided with a flange 213. The flange 213 acts as a piston and is slidable within a cylindrical member 214 through which the valve rod 211 passes. The flange 213, when displaced from a central position, is movable into contact with one or other of two spaced flanges 215, 216 of the cylindrical member 214, the flange 215 being an internal flange disposed at one end of the member 214 and the flange 216 extending both internally and externally of the member 214. The flange 216 acts as a piston within the valve body 212.

The cylindrical member 214 has an axially extending cylindrical portion which is slit longitudinally to form resilient fingers 217. The fingers 217 are engageable behind an internal shoulder 218 of a cylindrical member 220 which is secured to the pipe 152. Mounted within the member 220 is a substantially cylindrical detent member 221 which is urged by a spring 222 into a position in which it prevents withdrawal of the fingers 217 from the shoulder 218. A spring 223 urges the cylindrical member 214 towards the right and therefore, in the position of the parts illustrated in the drawings, forces the fingers 217 into firm contact with the shoulder 218.

Pipes 224, 225, which communicate with the interior of the valve body 212 to the left and right respectively of the flange 216, communicate with the ground nitrogen manifold 182 by way of solenoid valves 226, 227 respectively.

When the parts are arranged as shown, nitrogen from the manifold 182 is supplied to the pipe 225 and so to the right hand side of the flange 216, the left hand side of the flange 216 being vented to atmosphere by way of the pipe 224 and a vent 228. With the parts in this position, the valve 209 will be open since even if the flange 213 is (by means described below) forced into contact with the flange 215, the valve 209 will still be well spaced from its seat 210. It will be appreciated that this constitutes a "fail safe" arrangement effective when the rocket is in the air inasmuch as, if there is a failure of a kind affecting operation of the valve, the valve will remain locked in the open position in which fuel will continue to be supplied to the thrust chamber 150. This locking occurs by reason of the fingers 217 being locked behind the shoulder 218 by the detent member 221.

Figure 5:
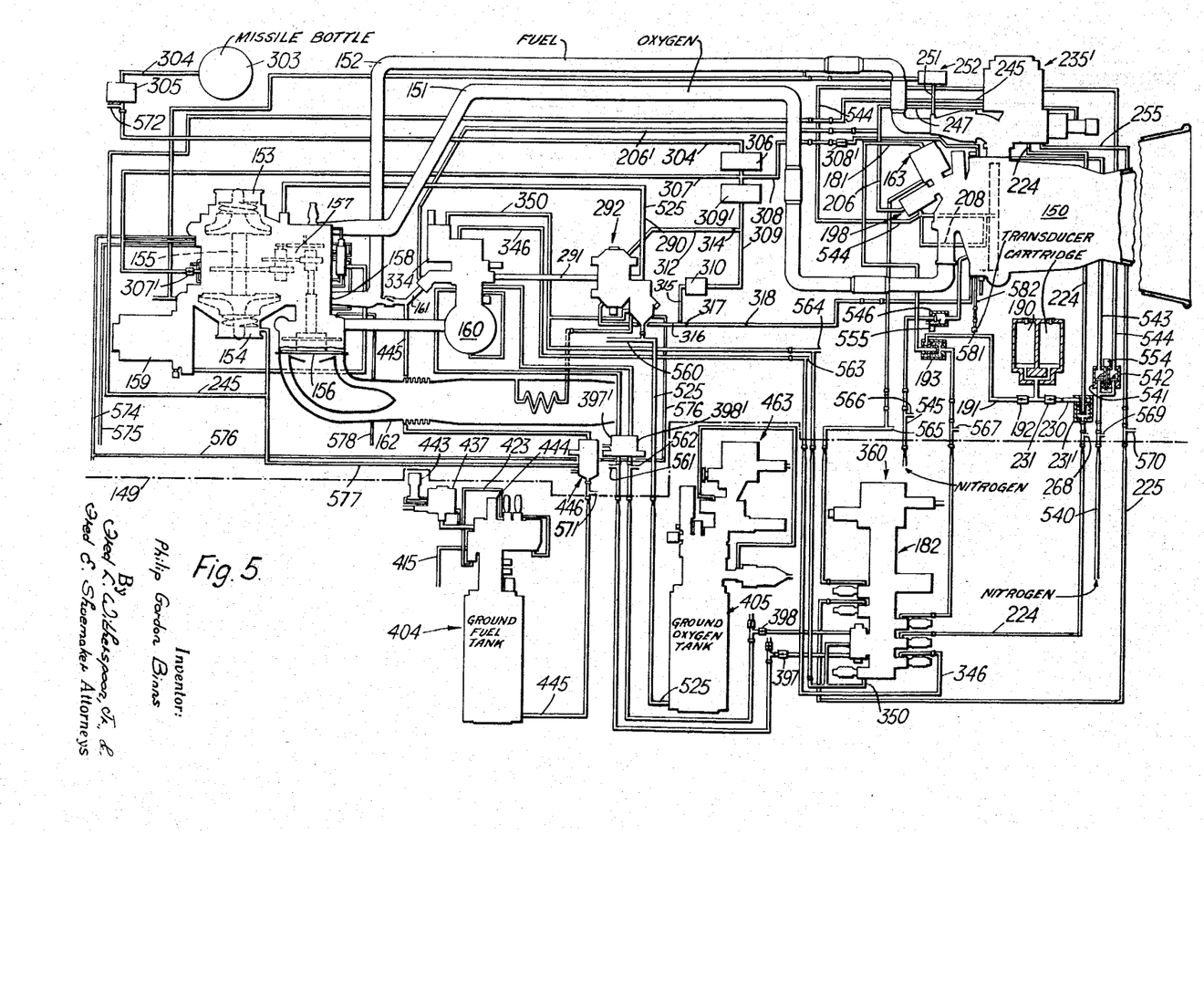
FIGURE 5 illustrates schematically a second, and preferred, embodiment of a rocket propulsion motor according to the invention.

If, however, it is desired to stop the flight of the rocket in the air and therefore to stop the fuel supply to the thrust chamber 150, this may be effected by firing the cartridge 190 (FIGURE 5). The gases produced as a result of such firing, are supplied to a pipe 230 and thence via non-return valves 231, 231' and the pipe 224 to the space within the valve body 212 to the left of the flange 216. This will force the detent member 221 towards the left, thus permitting the fingers 217 to ride over the shoulder 218 as a result of the pressure applied to the left hand side of the flange 216 both by the said gases and by the spring 222. The flange 216 will thus be forced towards the right and will cause corresponding movement of the flange 213, whereby to bring the valve 209 onto its seat 210.

On the ground, a "fail safe" arrangement is also provided since, if the electrical supply to the solenoids 226, 227 fails, or if the solenoids are de-energised by ground detector equipment which senses imperfect operation of the rocket propulsion motor, then nitrogen will be supplied through the pipe 224 to the space within the valve body 212 to the left of the flange 216 while the space within the valve body 212 to the right of the flange 216 will be vented to atmosphere by way of the pipe 225 and a vent 232. The valve 209 will thus be closed so as to cut off the fuel supply to the thrust chamber 150.

It is necessary to ensure that the supplies of liquid oxygen and fuel carried by the rocket are, in operation, exhausted simultaneously since a small error in the mixture ratio results in a relatively large error in the flight path of the rocket. For this reason sensing devices (not shown) are employed for sensing the instantaneous liquid levels in the liquid oxygen and fuel tanks of the rocket, and the signals produced by such sensing are used to throttle the fuel flow by up to, say ±15% so that there is at all times a desired relationship between the fuel and liquid oxygen flows. This throttling of the fuel flow is under the control of a servo valve 235 (FIGURE 12).

The servo valve 235 comprises a valve body 236 within which there is a chamber 237. Within the chamber 237 is a shuttle valve 238 provided with pistons 239, 240, 241. The pistons 239, 241 control flow through passages 243, 244 respectively which lead to a pipe 245 which communicates with the low pressure side of the fuel pump 154. The piston 240 is mounted within an annular chamber 242 and controls flow from a passage 246 into the parts of the chamber 237 to the left and right of the piston 240, the passage 246 leading to a pipe 247 which communicates with the pipe 206'.

A passage 248 communicates at one end with the space between the pistons 239, 240 in the chamber 237. At its other end, the passage 248 communicates, via a chamber 249, with an internal passage 250 extending axially of the valve rod 211, the passage 250 communicating with a pipe 251 leading to a valve body 252' of a bleed valve 252. The valve body 252' which communicates with a pipe 253 leading to the high pressure side of the fuel pump 154, has mounted within it a piston valve 254. The piston valve 254 is provided with a valve head 255 which is adapted to cooperate with a valve seat 256. A spring 257 acts on the piston valve 254 in a valve opening direction.

The bleed valve 252 is provided to permit the escape of air which is displaced during the initial filling of the valves 235, 209 with fuel, the said air passing through the valve 252 and through the pipe 253 to the top of the volute of the pump 154 where it escapes. When the pump 154 runs up to speed, the high pressure developed in the volute will prevent any further air flow through the bleed valve 252 since the high pressure fuel in the pipe 253 will force the piston valve 254 onto its seat 256.

Springs 260, 261 act on the left and right hand ends respectively of the shuttle valve 238 so as to centralise the latter. The said left and right hand ends are open to the pressures in passages 262, 263 respectively. The passages 262, 263 have outlets 264, 265 respectively, flow through both of which is controlled by an armature 266.

The armature 266 has a fulcrum 267, the position of the armature 266 at any moment depending upon the relative strength of the magnetic fields produced by a pair of spaced coils 268, 270. The coils 268, 270 are supplied with current in dependence upon signals representing the extent to which the amounts of fuel and oxygen left in the fuel and oxygen tanks of the rocket departs from the desired amounts.

The passages 262, 263 are interconnected by a passage 271 leading to a passage 272, the passage 272 leading to the annular chamber 242.

The armature 266 is disposed within a chamber 273 which is adapted to receive fuel flowing through the outlets 264, 265. A passage 274 communicates with the chamber 273, flow through the passage 274 being controlled by the piston 239.

The chamber 249 communicates with passages 275 formed within the valve rod 211, the passages 275 leading to the space within the cylindrical member 214 to the left of the flange 213. The valve rod 211 is also formed with an internal axial passage 276 one end of which communicates with the space within the cylindrical member 214 to the right of the flange 213 and the other end of which communicates with an annular chamber 277 which is formed between the valve rod 211 and an axial extension 278 of the valve body 212. A pipe 279 communicates at one end with the chamber 277 and at the other end with the space between the pistons 240, 241 in the chamber 237.

A feedback transducer 280 is adapted to produce a signal representative of the axial position of the valve rod 211. This signal is employed to adjust the signals applied to the coils 268, 270 so as to prevent overtravel of the valve rod 211.

It will be appreciated that, in operation, high pressure fuel flows via the pipes 206', 247, the annular chamber 242, and the passages 272, 271 to the passages 262, 263 and hence to the outlets 264, 265. However, if for instance the magnetic field of the coil 268 is momentarily stronger than that of the coil 270, the armature 266 will pivot about the fulcrum 267 so that the flow through the outlet 265 will be greater than that through the outlet 264. The pressure in the passage 262 will therefore be higher than that in the passage 263 with the result that the shuttle valve 238 will be forced towards the right. This will permit fuel in the annular chamber 242 to flow via the passages 248 and 275 to the left hand side of the flange 213, so as to move the flange 213 towards the right. The fuel on the right hand side of the flange 213 will be forced by this movement through the passage 276, pipe 279, passage 244 and pipe 245 back to the low pressure side of the fuel pump 154. The rightward travel of the flange 213 will move the valve 209 so as to reduce fuel flow to the thrust chamber 150.

If, on the other hand, the magnetic field of the coil 270 is stronger than that of the coil 268, the armature 266 will pivot so that the pressure in the passage 263 exceeds that in the passage 262. The shuttle valve 238 will therefore be forced to the left and the fuel from the passage 246 will flow via the pipe 279 to the right hand side of the flange 213 so as to force the flange 213 and valve 209 towards the left whereby to increase fuel flow to the thrust chamber 150. This leftward travel of the flange 213 will force the fuel within the cylindrical member 214 to the left of the flange 213 to flow via the passages 275, 248 and 243 to the pipe 245 and so to the low pressure side of the fuel pump 154.

The servo valve 235 therefore exercises a fine control over the supply of fuel to the thrust chamber 150 so as to ensure that the fuel flow bears at all times a desired relationship to the liquid oxygen flow. The servo valve 235, moreover, is so constructed as to adjust the fuel flow rapidly and without hunting.

Liquid oxygen is supplied to the gas generator 160 by way of a pipe 290 (FIGURE 6) which communicates with the high pressure side of the liquid oxygen pump 153, and a pipe 291 the flow through which is controlled by a throttle device 292.

Figure 6:
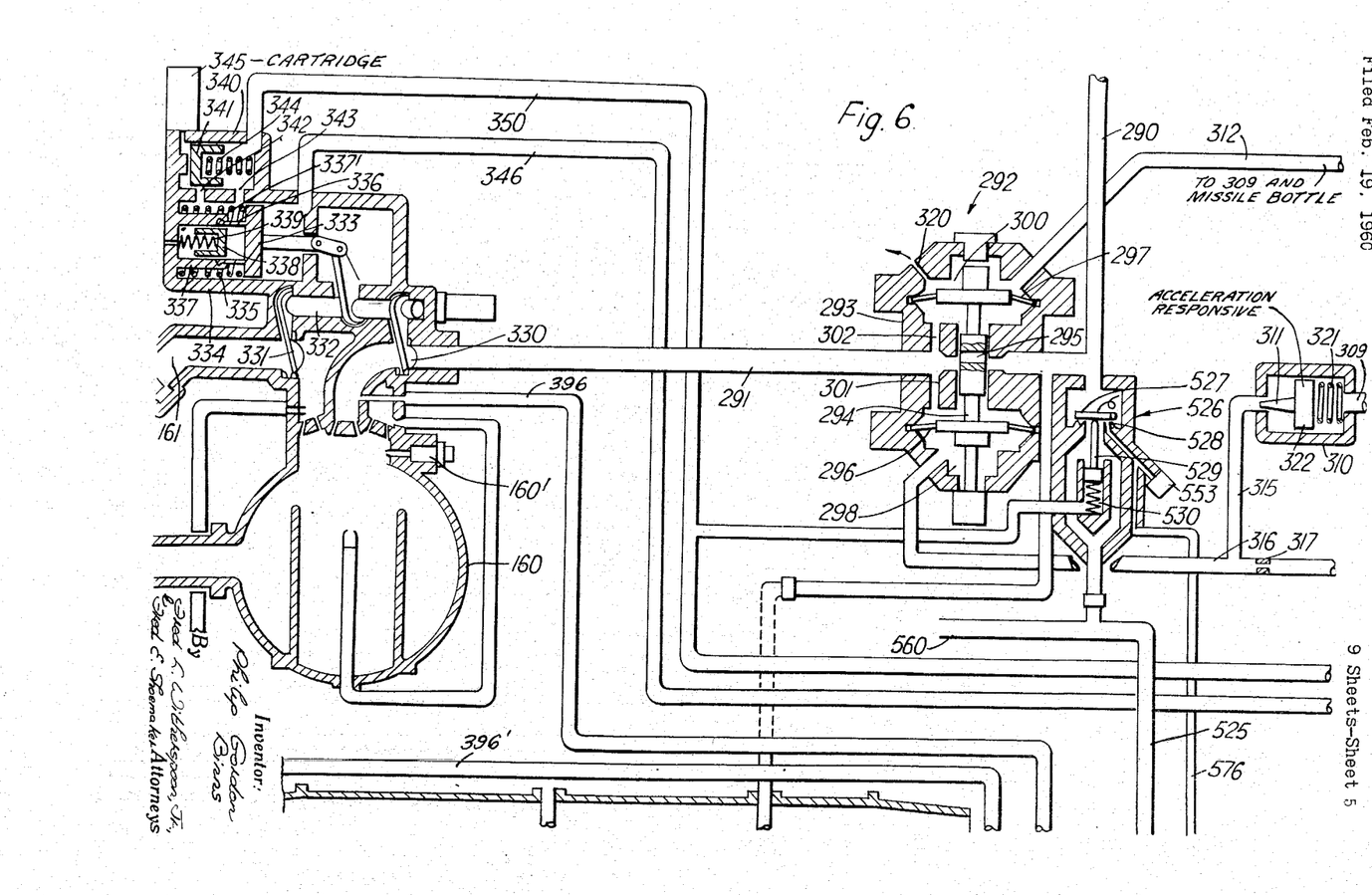
FIGURES 6–12 are views to a larger scale of certain portions of the motor shown in FIGURE 5.

The throttle device 292 comprises a valve body 293 within which is slidably mounted a valve member 294. The valve member 294 has a transverse hole 295 therethrough which may be brought into and out of alignment with the pipe 291 so as to throttle flow therethrough.

The valve member 294 is carried by a pair of spaced diaphragms 296, 297. The valve body 293 is formed with chambers 298, 300 which are respectively disposed below the diaphragm 296 and above the diaphragm 297. The space between the diaphragms 296, 297 is open to the pressure in the pipe 291 by way of passages 301, 302.

A missile bottle 303, which contains pressurised nitrogen, is open to a pipe 304, flow through which is controlled by a solenoid valve 305. The pipe 304 communicates by way of a regulating valve 306 with pipes 307, 308 which lead respectively to the gearbox 158 and to the thrust chamber 150 for the purging thereof. Non-return valves 307', 308' are provided in the pipes 307, 308 respectively so as to permit flow towards gearbox 158 and the thrust chamber only. The pipe 304 also communicates with a pipe 309, flow through which is controlled by a regulating valve 309'. Although the regulating valves 306, 309' are shown as separate members they may be constituted by two stages of a single valve.

A valve body 310 contains a needle valve 311 and communicates at one end with the pipe 309. A pipe 312, which contains a fixed restriction 314, communicates at one end with the chamber 300 and at the other end with the pipe 309. The end of the valve body 310 remote from the pipe 309 communicates with a pipe 315 leading to a pipe 316. The pipe 316, which contains fixed restrictions 317, 318, communicates at one end with the chamber 298 and at the other end with the thrust chamber 150.

The needle valve 311 is urged onto its seat by a spring 321. When the needle valve is so seated, the pressure in the chamber 298 will vary in sympathy with variation in the thrust chamber pressure. The pressure in the chamber 300, however, which is supplied from the missile bottle 303 via the regulating valves 306, 309', will constitute a fixed reference pressure, the value of which can be adjusted by adjustment (by means not shown) of the size of a bleed passage 320 from the chamber 300. Accordingly, if the pressure in the thrust chamber 150 increases, the pressure in the chamber 298 increases correspondingly and the valve member 294 will reduce liquid oxygen flow through the pipe 291 to the gas generator 160. If, on the other hand, pressure in the thrust chamber 150 decreases, the valve member 294 will increase flow through the pipe 291.

The throttle device 292, in controlling the flow of liquid oxygen to the gas generator 160, controls the speed of the turbine 156 and liquid oxygen pump 153, and therefore controls the liquid oxygen supply to the thrust chamber 150. Accordingly, so long as the needle valve 311 remains seated, the liquid oxygen supply to the thrust chamber 150 is controlled so as to ensure that the pressure in the thrust chamber, and hence the thrust produced, remains substantially constant.

If, however, a rocket proceeds with constant thrust its acceleration will continue to increase in the absence of any other controlling factor, since the mass of the rocket is continuously being reduced by the using up of fuel. If this acceleration is allowed to go on increasing, the thrust acting on parts such as gyroscopic bearings may be excessive. For this reason it is important to limit the acceleration of the rocket.

This is achieved in the present case by providing the needle valve 311 with a weight 322. The arrangement is such that when the force due to acceleration acting on the weight 322 reaches a certain level, say 10 $g$, the needle valve 311 starts to open. As the valve 311 opens, however, the pressure in the chamber 298 rises, whereby the valve member 294 is caused to reduce flow through the pipe 291.

Thus there is an initial period of the flight of the rocket in which its thrust is maintained substantially constant.

This initial period comes to an end at an exactly predetermined instant without the use of a timing device because the needle valve 311 starts to open at a predetermined acceleration of the rocket and the acceleration of the rocket at any instant will depend upon its mass. The mass of the rocket, however, reduces as the fuel is used up and thus the mass of the rocket itself depends on flight time.

After this initial period, however, the thrust is reduced in accordance with the extent to which the valve 311 opens. Thus the valve 311 may be profiled to give a predetermined acceleration programme from the point where the valve starts to open.

The flow of liquid oxygen and liquid fuel to the gas generator 160 through the pipes 291, 161 respectively is controlled by cut-off valves 330, 331 respectively. The valves 330, 331 are carried by a common spindle 332, which is connected to a piston 333 for rotation thereby between closed and open positions.

The piston 333, which is slidable in a cylinder 334, is acted on by a spring 335 in a valve opening direction. The piston 333 has an axially extending skirt portion which is slit longitudinally to form resilient fingers 336. The fingers 336 are engageable behind a shoulder 337' provided on a cylindrical member 337 mounted within the cylinder 334. A detent member 338, which is mounted within the cylindrical member 336, is urged by a spring 339 into the position in which the fingers 336 are locked behind the shoulder 337'.

Above the cylinder 334 is a valve body 340 in which is slidably mounted a change-over valve 341. The valve 341, which controls fluid flow through ports 342, 343 leading to the cylinder 334, is urged by a spring 344 towards the position in which it closes the port 342. A cartridge 345 is mounted above the valve body 340, the gases produced on the firing thereof being supplied to the space within the valve body 340 to the left of the change-over valve 341.

The space within the cylinder 334 to the right of the piston 333 is connected by a pipe 346 to the ground nitrogen manifold 182, communication between the pipe 346 and the manifold 182 being controlled by a solenoid valve 347 which, when shut, vents the pipe 346 to atmosphere via a vent 348.

The space within the valve body 340 to the right of the change-over valve 341 is connected by a pipe 350 to the manifold 182, communication between the pipe 350 and the manifold 182 being controlled by a solenoid valve 351 which, when shut, vents the pipe 350 to atmosphere via a vent 352.

When the rocket is on the ground and solenoid valves 347, 351 are energised, the parts are disposed as shown with the piston 333 locked in the position in which the valves 330, 331 are open. Nitrogen from the manifold 182 is supplied to the space within the cylinder 334 to the right of the piston 333 by way of the pipe 346 and venting of the space to the left of the piston 333 takes place by way of the port 343, pipe 350 and vent 352.

On de-energisation of the solenoid valves 347, 351 when the rocket is on the ground, nitrogen is supplied to the cylinder 334 by way of the pipe 350 and port 343, while the pipe 346 is vented through the vent 348. The detent member 338 is therefore forced to the left so as to permit the fingers 336 to ride over the shoulder 337', while the piston 333 is forced towards the right so as to effect closure of the valves 330, 331. Similarly, the moving of the detent member 338 and piston 333 towards the left and right respectively so as to effect closure of the valves 330, 331 may be effected in the air by firing the cartridge 345, the gases produced by such firing forcing the change-over valve 341 to the right and entering the cylinder 334 through the port 342.

It will therefore be appreciated that the valves 330, 331 are moved by means which "fail safe" both on the ground and in the air.

The ground nitrogen manifold 182 is provided at its top with a filling device 360. The filling device 360 comprises a chamber 361 containing an inlet filter 362, the chamber 361 being adapted to be supplied with nitrogen from a source, not shown, through a pipe 363. The chamber 361 communicates by way of a passage 364 with a chamber 365 which leads to an elongated chamber 366 by way of a restriction 367.

The restriction 367 is controlled by a needle valve 368. The needle valve 368 has an axial passage 370 therethrough incorporating a restriction 369. The needle valve 368 is carried by a piston 371 working in a cylinder 372. The pressure in the space above the piston 371 is therefore functionally related to the pressure in the elongated chamber 366.

The chamber 365 leads to a passage 373 which communicates with a passage 374 by way of a restriction 375. A pressure regulating valve 376 passes through the restriction 375, the position of the pressure regulating valve 376 being adjustable by a hand knob 377. Adjustment of the hand knob 377 therefore varies the effective size of the restriction 375 and hence the pressure in the passage 374. The latter communicates with the space below the piston 371.

If any substantial difference occurs in the pressures above and below the piston 371, this will speedily be corrected since the differential pressure will cause movement of the piston 371 and hence variation of the effective size of the restriction 367. Adjustment of the pressure below the piston 371 by the hand knob 377 therefore also effects adjustment of the pressure above the piston 371 and hence in the chamber 366.

A relief valve 380 is urged by a spring 381 towards the position in which it seals a port 382 leading from the elongated chamber 366. If the pressure in the chamber 366, however, rises above the pressure underneath the piston 371 by a predetermined value the relief valve 380 will be raised off its seating against the action of the spring 381.

The elongated chamber 366 leads to an annular chamber 383 from which nitrogen is supplied to the pipes 180, 181, 224, 225 and 346. A port 384 leads from the annular chamber 383 to the valve body 385 of a blow-off valve. Slidably mounted within the valve body 385 is a valve member 386 having an axial passage 387 therethrough, flow through which is controlled by a ball 388. The latter is engaged by a rod 390 which is carried for adjustment by a threaded stud 390'.

The ball 388 is adapted to seat on spaced valve seats 388', 388" within the valve member 386, the seats 388', 388" being spaced by a radial passage 387' which communicates with the passage 387.

A valve sleeve 389, which is mounted closely about the valve member 386, is urged leftwards by a spring 391 towards the closed position in which it cuts off communication between the port 384 and port 385' in the valve body 385.

The valve member 386 is urged towards the left by a spring 392 so that the ball 388 will normally be seated on its seat 388" whereby to prevent flow through the passage 387 to a port 393, but permitting the pressure at the port 384 to be communicated through the passage 387' to the space within the valve body to the right of the valve sleeve 389. The same pressure therefore acts on both the right hand and left hand ends of the valve sleeve 389. However, since the valve sleeve 389 contacts the valve body 385 at its left end the area of the pressure surface at the right hand end of the valve sleeve 389 is greater than that at the left hand end thereof, the said pressure urges the valve sleeve 389 towards its closed position.

If however the pressure in the annular chamber 383 rises above a predetermined value, the valve member 386 will first be forced to the right against the action of the spring 392 to a position in which the ball 388 is forced from its seat 388″ by contacting the rod 390. In this position of the parts, nitrogen may escape from the space within the valve body 385 to the right of the valve sleeve 389 and through the passage 387 to the port 393 in the valve body 385.

At the same time nitrogen will pass from the passage 387 and via the passage 387′ so as to act on the right hand end of the valve sleeve 389.

The pressure in the space within the valve body 385 to the right of the valve sleeve 389, will, by reason of the changed position of the ball 388 relative to its seats 388′ and 388″, be lower than at the port 384. The valve sleeve 389 will therefore move to the right against the spring 391 whereby nitrogen will be able to escape from port 384 through the ports 385′.

When this occurs the pressure in the annular chamber 383 will fall rapidly to a pressure below the aforementioned predetermined value, and the parts of the blow-off valve will return to their normal positions.

If the cause of the rise in predetermined pressure is still present then the cycle of operation of the blow-off valve will repeat, thus blowing off the excess supply of nitrogen, as the pressure within the annular chamber 383 rises and falls.

The annular chamber 383 communicates with a valve body 394 within which are mounted valve members 395, 395′ which control nitrogen flow from the annular chamber 383 to pipes 396′, 396 respectively. The pipes 396′, 396 lead via non-return valves 397, 397′ and non-return valves 398, 398′ respectively to the dome of the gas generator 160 for the purging of the fuel and liquid oxygen passages therein.

The nitrogen pressure from the manifold 182 will normally act on the pressure surfaces 399, 399′ of the valve members 395, 395′ respectively so as to seat the latter on their valve seats 400, 400′ respectively whereby to prevent flow through the pipes 396, 396′. When, however, the solenoid valve 351 is de-energised, nitrogen is supplied via the pipe 350 and a pipe 401 so as to act on pressure surfaces 402, 402′ of the valve members 395, 395′. This will cause the valve members 395, 395′ to be forced into their open positions in which nitrogen will flow through the pipes 396, 396′ for the purging of the gas generator 160.

In order to start the rocket propulsion motor on the ground, use is made of a fuel ground start tank 404 and a liquid oxygen ground start tank 405.

Figure 7:
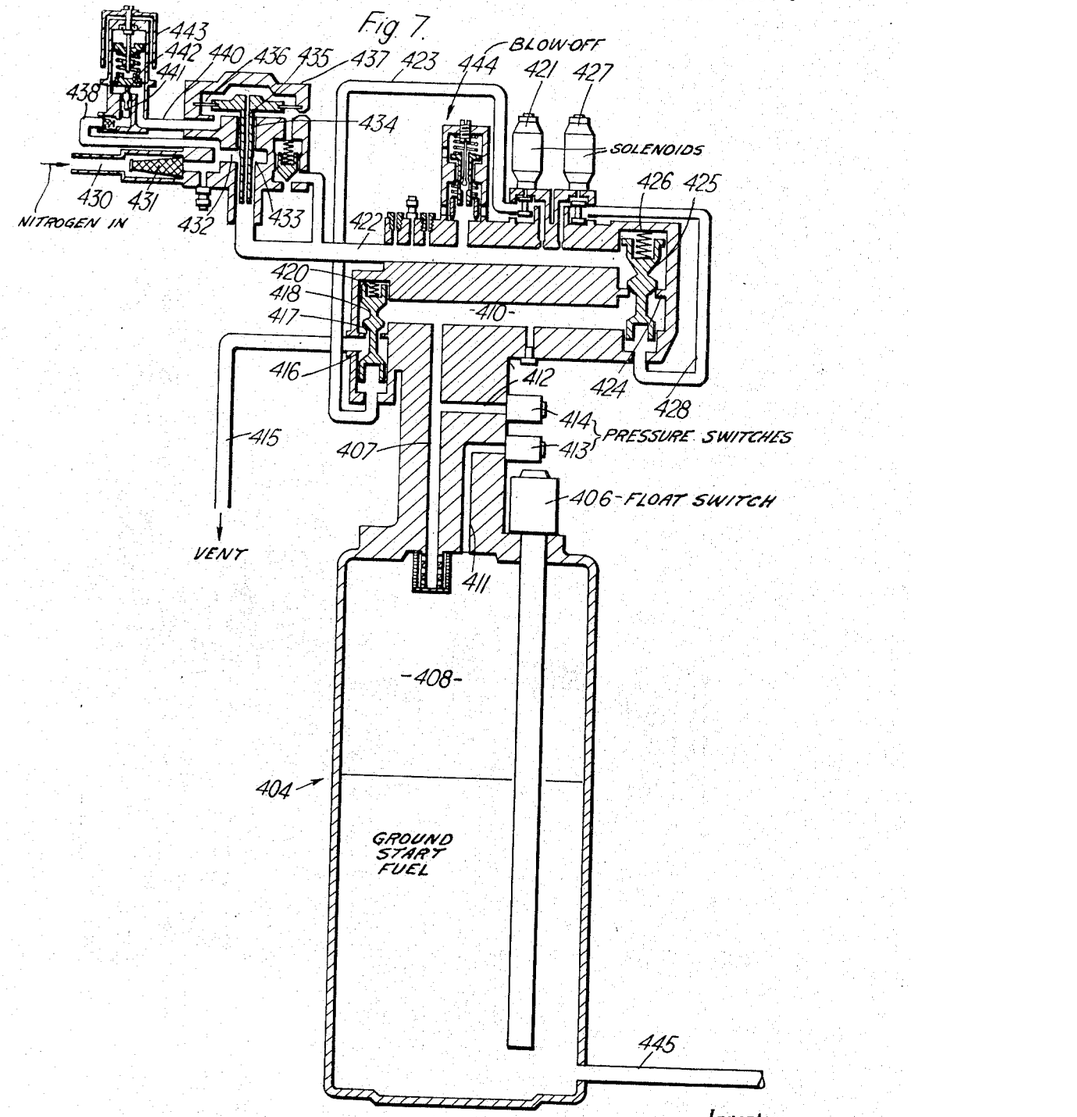

The fuel ground start tank 404, FIGURE 7, is provided with a float switch 406. A passage 407 in the upper part of the tank 404 establishes communication between the space 408 above the fuel in the tank and a chamber 410. Pressure tappings 411, 412 lead respectively from the space 408 and the passage 407 to pressure switches 413, 414 respectively.

A vent pipe 415 communicates with a chamber 416. The latter is in communication with the chamber 410 by way of an orifice 417 controlled by a valve 418. The valve 418 is urged downwardly towards the seated position by a spring 420. On energisation of a solenoid 421, however, pressurised nitrogen in a chamber 422 may flow via a pipe 423 to the underside of the valve 418 so as to raise the latter off its seating and against its spring 420 and so permit venting of the space 408.

The chamber 422 is in communication with the chamber 410 by way of an orifice 424 controlled by a valve 425. The valve 425 is urged downwardly towards the seated position by a spring 426. On energisation of a solenoid 427, however, pressurised nitrogen in the chamber 422 flows via a pipe 428 to the underside of the valve 425 so as to raise the latter off its seating, whereby the pressurised nitrogen will flow from the chamber 422 and via the chamber 410 and passage 407 to the space 408 so as to pressurise the fuel in the tank 404.

The nitrogen for pressurising the fuel is supplied from a source, not shown, and via a pipe 430 and filter 431 to a chamber 432. The latter communicates with the chamber 422 by way of an orifice 433 through which extends a needle valve 434. The needle valve 434, which has an axial passage 435 therethrough, is carried by a diaphragm 436 mounted within a cylinder 437.

The chamber 432 also communicates with a passage 438 which leads to a passage 440 by way of an orifice 441 controlled by a valve 442. The valve 442 may be adjusted by rotating a cap 443 and such adjustment will alter the pressure below the diaphragm 436 and hence after the pressure in the chamber 422. A blow-off valve 444, of exactly the same construction as the valve 385 (FIGURE 10), is provided to prevent the pressure in the chamber 422 exceeding a predetermined value.

A pipe 445, which communicates with the bottom of the tank 404, leads via a non-return valve 446 (FIGURE 8) and the pipe 161 to the fuel pipe 152.

The non-return valve 446 comprises a valve member 447 which is adapted to cooperate with a valve seat 448. A valve stem 449, which engages the valve member 447, is acted upon by a spring 450, which causes the valve member 447 to be spaced from its seat 448 except when the fuel in the pipe 445 is at high pressure.

The tank 404 is filled by energising the solenoid 421 (by means not shown) so as to raise the valve 418 from its seating and thus vent the space 408. Fuel from the fuel tank (not shown) in the rocket will flow to the pump 154 and so via the pipes 161, 445 to the tank 404. Since this fuel will not be pressurised by the pump 154 (which will be inoperative at this time) the non-return valve 446 will be open. After a predetermined amount of fuel has been introduced into the tank 404, the float switch 406 operates so as to cause de-energisation of the solenoid 421. The space 408 is then no longer vented to atmosphere but the tank 404 continues to receive fuel from the fuel tank in the rocket until the pressure in the space 408 equals the pressure in the corresponding space in the said fuel tank in the rocket.

A source of nitrogen will previously have been connected to the pipe 430 and the cap 443 will have been adjusted so that the chamber 422 is supplied with nitrogen at a desired pressure. Accordingly, on energisation of the solenoid 427 (by means not shown), the valve 425 will lift off its seating and nitrogen from the chamber 422 will flow via the chamber 410 and passage 407 to the space 408 so as to pressurise the latter. When the pressure in the space 408 reaches a predetermined value, the pressure switch 413 operates so as to indicate that the tank 404 has been pressurised.

The pressure switch 414 is employed at shut down, the switch 414 operating when the pressure in the space 408 has fallen to a predetermined value.

The liquid oxygen ground start tank 405 (FIGURE 9) is provided with a float switch 457 and with a pressure switch 460 which is responsive to the pressure in the space 461 above the liquid oxygen in the tank 405. The tank 405 is also provided with an adjustable relief valve 462 and with a valve 463 which is provided with a filling pipe 464, an adjustment knob 465, and a chamber 466. The valve 463 will not be described in detail since it is substantially identical to the valve 360. It will therefore be appreciated that adjustment of the knob 465 effects adjustment of the pressure in the chamber 466.

A chamber 467 communicates with the chamber 466 by way of a port 468 flow through which is controlled by a valve member 470. A passage 471 leading to the space 461 communicates with the chamber 467, communication between the passage 471 and chamber 467 being controlled by a valve 472. A spring 473 urges a mushroom head 474 on the valve 472 into the position in which the chamber 467 is sealed off from the passage 471. At its end 475 remote from the mushroom head 474, the valve 472 is adapted to seat on a valve seat 476 which forms the entry to a vent valve 477.

A solenoid-operated valve 478 is provided for effecting opening and closing of the valve member 470. The solenoid-operated valve 478 comprises a valve body 480 within which is mounted an axially movable valve member 481. The valve member 481 has enlarged diameter portions 482, 483 which are adapted to cooperate respectively with valve seats 484, 485. The valve member 481 also has an axial passage 486 therethrough which extends to the left hand end of the valve member 481 and, at its right end, communicates with a chamber 487 having a vent 488.

One end of a passage 490 in the valve body 480 communicates at all times with the chamber 466. The other end of the passage 490 communicates with the right hand side of the enlarged diameter portion 483. The valve body 480 also has a passage 491 therein, one end of the passage 491 leading to the right hand end of the valve member 470 and the other end of the passage 491 leading to the space between the enlarged diameter portions 482, 483.

Figure 9:
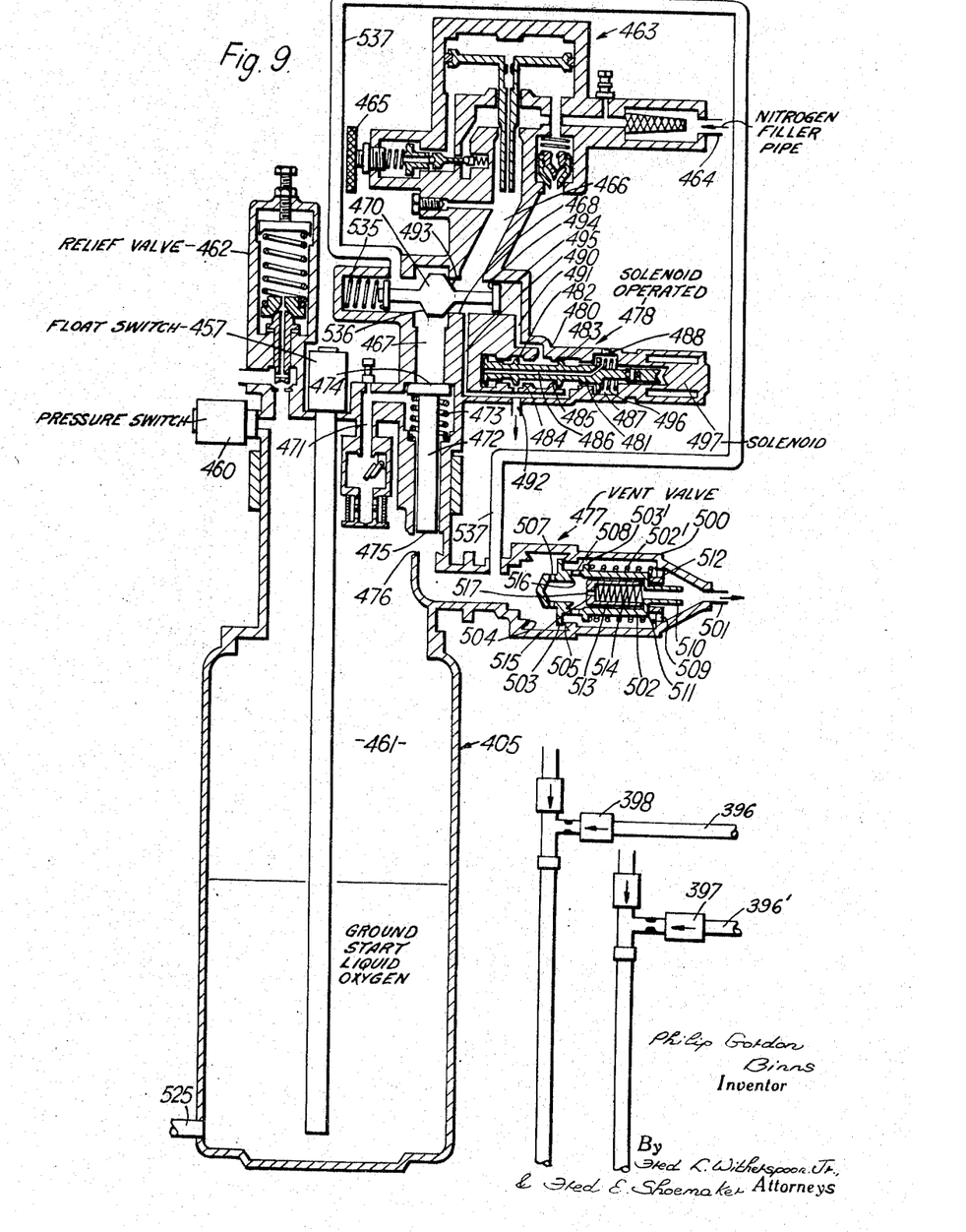

A spring 496 urges the valve member 481 towards the left and into the position shown in FIGURE 9 in which the enlarged diameter portion 483 will be seated on its valve seat 485 so as to cut off the passage 490 from the passage 491. In this position, the passage 491 will be vented by way of a vent 492. The pressure in the chamber 466 will therefore merely act on the oppositely facing pressure surfaces 493, 494 of the valve member 470 and there will be substantially no pressure acting on the pressure surface 495 at the right hand end thereof. The valve member 470 will therefore remain closed.

When, however, the valve member 481 is moved towards the right by a solenoid 497, communication is established between the passages 490, 491. The pressure in the chamber 466 will therefore act on all three of the pressure surfaces 493, 494, 495, whereby the valve member 470 will move towards the left permitting pressurised nitrogen to flow into the chamber 467. This will cause the valve 472 to move downwardly so as to seat on the valve seat 476 and so as to permit flow of nitrogen into the space 461 via the passage 471.

The vent valve 477 has a valve body 500 provided with a vent passage 501 at its right hand end. Within the valve body 500 there is movably mounted a hollow poppet valve 502. The poppet valve 502 is provided with outwardly extending flanges 503, 503'. The flange 503 is adapted to seat on spaced valve seats 504, 505 which are provided within the valve body 500. A spring 502' normally acts on the flange 503' so as to urge the flange 503 into seating contact with the valve seat 504.

The poppet valve 502 is provided adjacent its left hand end with radial drillings 507 and is provided between the flanges 503, 503' with radial drillings 508, the drillings 507, 508 communicating with the hollow interior of the poppet valve 502.

At its right end, the poppet valve 502 has a reduced diameter portion 510, a shoulder 511 being provided between the portion 510 and the main part of the poppet valve 502. The reduced diameter portion 510 is slidable within a sleeve 512 which is carried by an apertured flange 509 mounted within the valve body 500. The left hand end of the sleeve 512 is thus adapted to act as an abutment for the shoulder 511 so as to limit rightward travel of the poppet valve 502.

Within the poppet valve 502 there is slidably mounted a cylindrical relief valve 513. A spring 514, which bears against the shoulder 511, is mounted within the relief valve 513 and urges the latter towards the position in which its left hand end wall 515 is seated on a valve seat 516 provided internally of the poppet valve 502. An axial drilling 517 extends through the end wall 515.

A pipe 525, which communicates with the bottom of the tank 405, leads via a non-return valve 526 (FIGURE 6) to the high pressure side of the liquid oxygen pump 153. The non-return valve 526 comprises a valve member 527 which is adapted to cooperate with a valve seat 528. A valve stem 529, which engages the valve member 527, is acted upon by a spring 530 which causes the valve member 527 to be spaced from its valve seat 528 except when the liquid oxygen in the pipe 525 is at high pressure.

The tank 405 is filled by the liquid oxygen in the tank thereof (not shown) in the rocket flowing via the pump 153 and pipe 525 to tank 405. Since the pump 153 will, at this stage, be inoperative, the liquid oxygen in the pipe 525 will not be at a high pressure and the non-return valve 526 will therefore be open.

During the initial stage of the filling of the tank 405, the flange 503 of the poppet valve 502 will be maintained by the spring 502' on the valve seat 504. In this position the poppet valve will maintain a small pressure in the tank 405, a small flow of gaseous oxygen escaping through the drillings 507, 517. There will be no escape of gaseous oxygen at this stage through the drillings 508 since the latter will be closed off by the relief valve 513 whose end wall 515 will be seated on the valve seat 516.

The liquid oxygen, on entering the tank 405, boils and produces large volumes of gaseous oxygen. The poppet valve 502 is designed to permit these large volumes of gaseous oxygen to escape with a minimum increase in back pressure. This is effected by reason of the gaseous oxygen forcing the poppet valve 502 to a position in which the flange 503 is disposed between the valve seats 504, 505, the momentum of the gas being insufficient to force the flange 503 onto the valve seat 505. This permits large flows of gaseous oxygen to escape through the space between the valve body 500 and the poppet valve 502 and so via the apertured flange 509 to the vent passage 501.

When the tank 405 is full, the liquid oxygen will act on the poppet valve 502 so as to cause the flange 503 to seat on the valve seat 505. This will prevent further escape of large volumes of gas, although a small flow of gas will still continue through the drillings 507, 517. This position of the poppet valve 502 is the one shown in FIGURE 9.

The poppet valve 502, in moving into the position shown in FIGURE 9, has ceased to act as a low pressure relief valve, but the relief valve 513, which is urged towards its seat 516 by the spring 514, will control the blow-off pressure in the tank 405 to a higher value than that which existed at the start of the filling operation.

When the tank 405 is full, the float switch 457 causes energisation of the solenoid 497 of the valve 478, whereby the valve member 481 moves to the right. The valve member 470 will therefore be forced towards the left against a spring 535 and against the pressure of the boiling liquid oxygen in the space 461, which pressure is transmitted to a pressure surface 536 by a pipe 537. Pressurised nitrogen will then flow into the space 461 so as to pressurise the liquid oxygen.

A pipe 540 (FIGURE 5) which is adapted to be supplied with nitrogen from a source not shown, communicates via non-return valves 541, 542 with pipes 543, 544 respectively. The pipes 543, 544 are respectively provided for the purging of the fuel inlet to the thrust chamber 150 and for the purging of the pipes 207, 208.

Similarly, a pipe 545, which may be supplied with nitrogen from the said source, communicates by way of a non-return valve 546 with the liquid oxygen inlet to the thrust chamber 150 so as to effect purging thereof.

The non-return valves 397', 398', 446, 526, 541–2, and 546 are provided with pressure switches 550, 551, 552, 553, 554, 555 respectively for indicating when the valves are fully closed. The switches 550–555 may be constituted by switches of the kind disclosed in our co-pending United States patent application No. 8053.

The rocket may be provided with two propulsion motors, the pipe connections 560–572 leading to the second engine.

Drain pipes 574, 578 are provided for the draining of surplus lubricant and fuel.

A transducer 581 is provided for measuring the pressure in the thrust chamber 150, the said pressure being transmitted to the transducer 581 through a pipe 582.

On starting the rocket propulsion motor, the valves 163, 209, which control supply of liquid oxygen and fuel to the thrust chamber, are closed, as are the valves 330, 331. The rocket will, of course, at this stage be on the ground and will be connected to its ground equipment including the manifold 182 and tanks 404, 405.

The rocket propulsion motor is started by first pressurising the tanks 404, 405 which will have been previously filled with fuel and liquid oxygen respectively. When this pressurisation has been completed, signals are obtained from the switches 413 and 460 and these signals are used to effect firing of a thrust chamber igniter (not shown). Embodied in the said igniter is a detector member which is burnt through as a result of such firing and which produces a signal which causes the solenoid 183 to be energised. As a result, the valves 163 open and low pressure liquid oxygen from the tank thereof in the rocket will flow via the pipe 151 to the thrust chamber 150.

The opening of the valve 163 will allow the valve member 197 to be forced open by low pressure fuel from the tank thereof in the rocket, this low pressure fuel reaching the valve member 197 via the pipes 161, 206' and 206. A small flow of fuel will therefore pass via the pipes 207, 208 to the thrust chamber 150 where it will be ignited with the low pressure flow of oxygen. As a result, an ignition detector wire 150', spanning the thrust chamber 150, will be burnt through and this (by means not shown) produces a signal which effects energisation of the solenoid valve 227 and therefore opening of the valve 209. At this stage, however, no fuel or liquid oxygen will have entered the gas generator 160 since the valves 330, 331 will have been enclosed.

On the opening of the valve 209, however, a signal will be produced (by means not shown) which causes firing of an igniter 160' in the gas generator 160. When such firing has been detected by detector means (not shown), a signal is produced which effects energisation of the solenoid valve 347, whereby the valves 330, 331 open. Fuel and liquid oxygen from the tanks 404, 405 will therefore enter the gas generator 160 and ignite therein. The gases produced by the gas generator 160 will drive the turbine 156 and hence the pumps 153, 154 which will bring the liquid oxygen and fuel supplies to the thrust chamber 150 up to full pressure.

At 80% of full pressure, the non-return valves 446, 526 close, their closure being signalled by the pressure switches 552, 553. The tanks 404, 405 may be depressurized and, if the rocket propulsion motor, which should now be self-sustaining in operation, continues to run satisfactorily, the rocket may be released.

I claim:

1. A rocket propulsion motor comprising combustion equipment, a fluid conduit for supplying the combustion equipment with a fluid adapted to take part in combustion, a valve for controlling flow through said fluid conduit, said valve comprising a valve closure member which is movable between a closed and an open position, and two devices for effecting movement of the valve closure member, the first of said devices comprising retaining means for normally retaining the valve closure member in the open position and overriding means for overriding the retaining means and moving the valve closure member to the closed position, and the second device comprising retaining means for normally retaining the valve closure member in the closed position and overriding means for overriding the retaining means and moving the valve closure member to the open position.

2. A rocket propulsion motor comprising combustion equipment, a fluid conduit for supplying the combustion equipment with a fluid adapted to take part in combustion, a valve for controlling fluid flow through said fluid conduit, said valve comprising a valve closure member which is movable between a closed and an open position, and two devices for effecting movement of the valve closure member, the first of said devices comprising latch means for normally retaining the valve closure member in the open position and unlatching means for unlatching the latch means and moving the valve closure member to the closed position, and the second device comprising retaining means for normally retaining the valve closure member in the closed position and overriding means for overriding the retaining means and moving the valve closure member to the open position.

3. A rocket propulsion motor comprising combustion equipment, a fluid conduit for supplying the combustion equipment with a fluid adapted to take part in combustion, a valve for controlling fluid flow through said fluid conduit, said valve comprising a valve closure member which is movable between a closed and an open position, and two devices for effecting movement of the valve closure member, the first of said devices comprising latch means for normally retaining the valve closure member in the open position and unlatching means for unlatching the latch means and moving the valve closure member to the closed position, and the second device comprising pressure fluid operated retaining means for normally retaining the valve closure member in the closed position and overriding means for overriding the retaining means and moving the valve closure member to the open position.

4. A rocket propulsion motor comprising combustion equipment, a fluid conduit for supplying the combustion equipment with a fluid adapted to take part in combustion, a valve for controlling fluid flow through said fluid conduit, said valve comprising a valve closure member, a cylinder and a piston working therein, the valve closure member being connected to the piston for movement thereby, means for moving the piston in the cylinder to positions in which the valve closure member will be respectively opened and closed, latch means movable into and out of engagement with said piston, means operative upon the piston moving into one of said positions, for moving the latch means so that it engages the piston and prevents retraction thereof into the other position, and means for withdrawing the latch means so as to permit said retraction.

5. A rocket propulsion motor comprising combustion equipment, a fluid conduit for supplying the combustion equipment with a fluid adapted to take part in combustion, a valve for controlling fluid flow through said fluid conduit, said valve comprising a valve closure member, a cylinder and a piston working therein, the valve closure member being connected to the piston for movement thereby, the piston being movable in the cylinder to positions in which the valve closure member will be respectively opened and closed, latch means movable into and out of engagement with said piston, means operative upon the piston moving into one of said positions for moving the latch means so that it engages the piston and prevents retraction thereof into the other position, means for withdrawing the latch means so as to permit said retraction, a pressure fluid source, means for connecting opposite ends of the cylinder to the pressure fluid source, and a control valve for connecting a selected end of the cylinder to the pressure fluid source and for venting the other end.

6. A rocket propulsion motor comprising combustion equipment, a fluid conduit for supplying the combustion equipment with a fluid adapted to take part in combustion, a valve for controlling fluid flow through said fluid conduit, said valve comprising a valve closure member, a cylinder and a piston working therein, the valve closure member being connected to the piston for movement thereby, the piston being movable in the cylinder to positions in which the valve closure member will be respectively opened and closed, latch means movable into and out of engagement with said piston, means operative upon the piston moving into one of said positions for moving the latch means so that it engages the piston and prevents retraction thereof into the other position, a first pressure fluid source, means for connecting opposite ends of the cylinder to the first pressure fluid source, a control valve for connecting a selected end of the cylinder to the first pressure and for venting the other end, means operative upon the control valve being set so that pressure fluid is supplied to one of the ends of the cylinder for supplying pressure fluid from the first pressure fluid source to the latch means to effect unlatching thereof, and a second fluid pressure source which is connected to the said one end of the cylinder and to the latch means so as to be adapted to effect unlatching of the latter.

7. A rocket propulsion motor comprising a thrust chamber, a duct for supplying said thrust chamber with liquid material for supporting combustion within the thrust chamber, a cut-off valve for stopping flow through said duct, means operable upon the occurrence of a failure in said rocket propulsion motor while the latter is on the ground for maintaining the valve closed, and means operable upon the occurrence of a failure in said rocket propulsion motor while the latter is in flight for maintaining the valve open, and means for restricting liquid flow through said duct so as to limit the acceleration of the rocket.

8. A rocket propulsion motor comprising a thrust chamber, a duct for supplying said thrust chamber with liquid material for supporting combustion within the thrust chamber, a cut-off valve for stopping liquid flow through said duct, means operable upon the occurrence of a failure in said rocket propulsion motor while the latter is on the ground for maintaining the valve closed, means operable upon the occurrence of a failure in said rocket propulsion motor while the latter is in flight for maintaining the valve open, a throttle for restricting liquid flow through said duct so as to limit the acceleration of the rocket, said throttle comprising a valve member having two oppositely facing pressure surfaces, means for applying a reference pressure to one surface, and means for applying the thrust chamber pressure to the other surface.

9. A rocket propulsion motor comprising a thrust chamber, a duct for supplying said thrust chamber with liquid material for supporting combustion within the thrust chamber, a cut-off valve for stopping liquid flow through said duct, means operable upon the occurrence of a failure in said rocket propulsion motor while the latter is on the ground for maintaining the valve closed, means operable upon the occurrence of a failure in said rocket propulsion motor while the latter is in flight for maintaining the valve open, a throttle for restricting liquid flow through said duct so as to limit the acceleration of the rocket, said throttle comprising a valve member having two oppositely facing pressure surfaces, means for applying a reference pressure to one surface, means for applying the thrust chamber pressure to the other surface, a passage which communicates with both pressure surfaces, a valve in said passage and means to retain said valve in a closed position until the acceleration of the rocket exceeds a predetermined value.

10. A rocket propulsion motor comprising a thrust chamber, ducts for supplying the thrust chamber with a liquid fuel and an oxidant from sources thereof, a cut-off valve for stopping liquid flow through at least one of said ducts, means operable upon the occurrence of a failure in said rocket propulsion motor while the latter is on the ground for maintaining the valve closed, means operable upon the occurrence of a failure in said rocket propulsion motor while the latter is in flight for maintaining the valve open, and means for adjusting the relative amounts of liquid fuel and oxidant supplied through said ducts to the thrust chamber so as to ensure that the the said sources of liquid fuel and oxidant are exhausted substantially simultaneously.

11. A rocket propulsion motor as claimed in claim 3 in which both the unlatching means and the overriding means are pressure fluid operated.

12. A rocket propulsion motor as claimed in claim 5 in which, when the control valve is set so that pressure fluid is supplied to one of the ends of the cylinder, pressure fluid is also supplied from the pressure fluid source to the latch means to effect unlatching thereof.

13. A rocket propulsion motor as claimed in claim 7 in which the flow restricting means maintain the thrust produced by the rocket propulsion motor substantially constant during an initial portion of the flight of the rocket and thereafter reduce the thrust in a predetermined manner.

14. A rocket propulsion motor as claimed in claim 10 in which means are provided for throttling the flow of liquid fuel to the thrust chamber so that said flow bears at all times a predetermined relationship to the flow of oxidant.

15. A rocket propulsion motor as claimed in claim 10 in which the cut-off valve has a valve closure member which is movable, when in the open position, by means responsive to the extent to which the said sources of liquid fuel and oxidant have become exhausted.

References Cited

UNITED STATES PATENTS 2,721,571  10/1955  Gershon __________ 251—73 X

FOREIGN PATENTS 1,058,802  6/1959  Germany.

CARLTON R. CROYLE, *Primary Examiner.*

SAMUEL FEINBERG, ARTHUR M. HORTEN,
*Examiners.*